United States Patent [19]
Tsutsui

[11] Patent Number: 5,654,894
[45] Date of Patent: Aug. 5, 1997

[54] GAIN CHANGING CONTROL SYSTEM FOR A THREADING APPARATUS

[75] Inventor: Katsunori Tsutsui, Chita-gun, Japan

[73] Assignee: Brother Kogyo Kabushiki Kaisha, Nagoya, Japan

[21] Appl. No.: 496,003

[22] Filed: Jun. 28, 1995

[30] Foreign Application Priority Data

Sep. 14, 1994 [JP] Japan ................................. 6-247170

[51] Int. Cl.$^6$ ...................... G06F 19/00; G05B 19/25
[52] U.S. Cl. .................... 364/474.3; 364/474.11; 364/474.15; 318/571; 408/9
[58] Field of Search ................... 364/474.3, 474.11, 364/474.15; 318/569, 571; 408/9, 8, 13

[56] References Cited

U.S. PATENT DOCUMENTS

| | | | |
|---|---|---|---|
| 4,656,405 | 4/1987 | Kiya et al. | 318/571 |
| 4,789,943 | 12/1988 | Yamanaka et al. | 364/474.28 |
| 4,879,660 | 11/1989 | Asakura et al. | 364/474.15 |
| 5,091,860 | 2/1992 | Fujimoto | 364/474.11 |
| 5,100,271 | 3/1992 | Kameyama et al. | 409/231 |
| 5,184,053 | 2/1993 | Maruo et al. | 318/571 |
| 5,307,549 | 5/1994 | Tsutsumi et al. | 29/27 C |
| 5,404,308 | 4/1995 | Kajiyama | 364/474.3 |
| 5,538,369 | 7/1996 | Okuda | 408/3 |

FOREIGN PATENT DOCUMENTS 60-155319  8/1985  Japan .

*Primary Examiner*—Paul P. Gordon
*Attorney, Agent, or Firm*—Oliff & Berridge

[57] ABSTRACT

A threading apparatus is capable of eliminating a rise delay in the feed velocity due to friction resistance and can perform high-precision threading even in high-speed tapping. A feed servo amplifier is controlled to operate using one of a plurality of gains. A gain setter sets the plurality of gains, which include a high gain, which is high enough to overcome static friction resistance, and a normal gain. A gain changer selects one of the plurality of gains for the feed servo amplifier. In particular, the gain changer selects the high gain during a start period of tapping operation and then selects the normal gain after the start period. Therefore, a rise delay in the feed velocity due to friction resistance during the start period of the tapping operation can be compensated for. After the start period, the normal gain is selected. Thus, high-precision threading can be performed over the course of the tapping operation with no errors.

18 Claims, 4 Drawing Sheets

Fig.1

Fig.2(A) ROTATION VELOCITY

Fig.2(B) FEED VELOCITY

Fig.2(C) GAIN CHANGE TIMING SIGNAL

GAIN CHANGING CONTROL SYSTEM FOR A THREADING APPARATUS

BACKGROUND OF THE INVENTION

1. Field of the Invention

This invention is directed to a threading apparatus such as a machining center or a tapping machine for performing tapping.

2. Description of the Related Art

Conventionally, a numerically controlled (NC) tapping operation in an NC threading apparatus or device is controlled by generating signals in the NC device for controlling the feed rate of a spindle head and the rotation rate of a spindle, based on a pitch of the screw threads to be formed. A feed motor for feeding the spindle head and a rotation motor for rotating the spindle are controlled as independent servo systems. A deviation between a feed quantity and a rotation quantity occurs, for example, when reversing the rotation motor, and is absorbed by mechanical expansion and contraction of a tapper interposed between a tapping tool and the spindle. Accordingly, a threading speed is limited by the performance of the tapper.

To cope with this problem, an apparatus has been proposed for synchronously controlling the feed motor and the rotation motor, such as an apparatus designed to detect an actual feed quantity and drive the rotation motor according to the detected feed quantity (see Laid-open Japanese Patent Application No. 60-155319), or an apparatus designed to drive the rotation motor according to a feed velocity and a feed acceleration (see U.S. Pat. No. 4,879,660). These apparatus are able to obtain a high synchronization precision between the feed and the rotation, so that threading can be performed in most cases without needing the tapper.

However, in recent years, reduced machining times have increasingly been demanded. In addition, high-speed threading at a speed near the limit of the tapping tool is sometimes performed. If the machine is in an ideal condition, threading can be performed at a relatively high speed even by the conventional apparatuses. However, since a supporting system of an actual machine, rather than the ideal machine, has friction resistance, the friction resistance sometimes interferes with high-speed threading.

The feed friction resistance of the spindle head is different from rotational friction resistance of the spindle. In general, the feed friction resistance is greater than the rotational friction resistance. In the apparatus disclosed in U.S. Pat. No. 4,879,660, the rotation motor is driven according to a feed acceleration in addition to a feed velocity. Accordingly, fluctuations in the feed velocity due to dynamic friction resistance in a constant-speed threading operation can be eliminated to obtain a high synchronization precision. However, a rise delay in the feed velocity due to static friction resistance when starting the tapping operation cannot be eliminated, thus causing a decrease in the synchronization precision. In other words, the rotation velocity of the spindle quickly rises when starting the tapping operation, but the feed velocity of the spindle head does not quickly rise when starting the tapping operation, hindering high-speed threading. Further, although the static friction resistance can be eliminated by increasing a gain in the feed driving means, the gain increase causes hunting in the constant-speed threading operation, thus making proper threading impossible.

Figure 3:
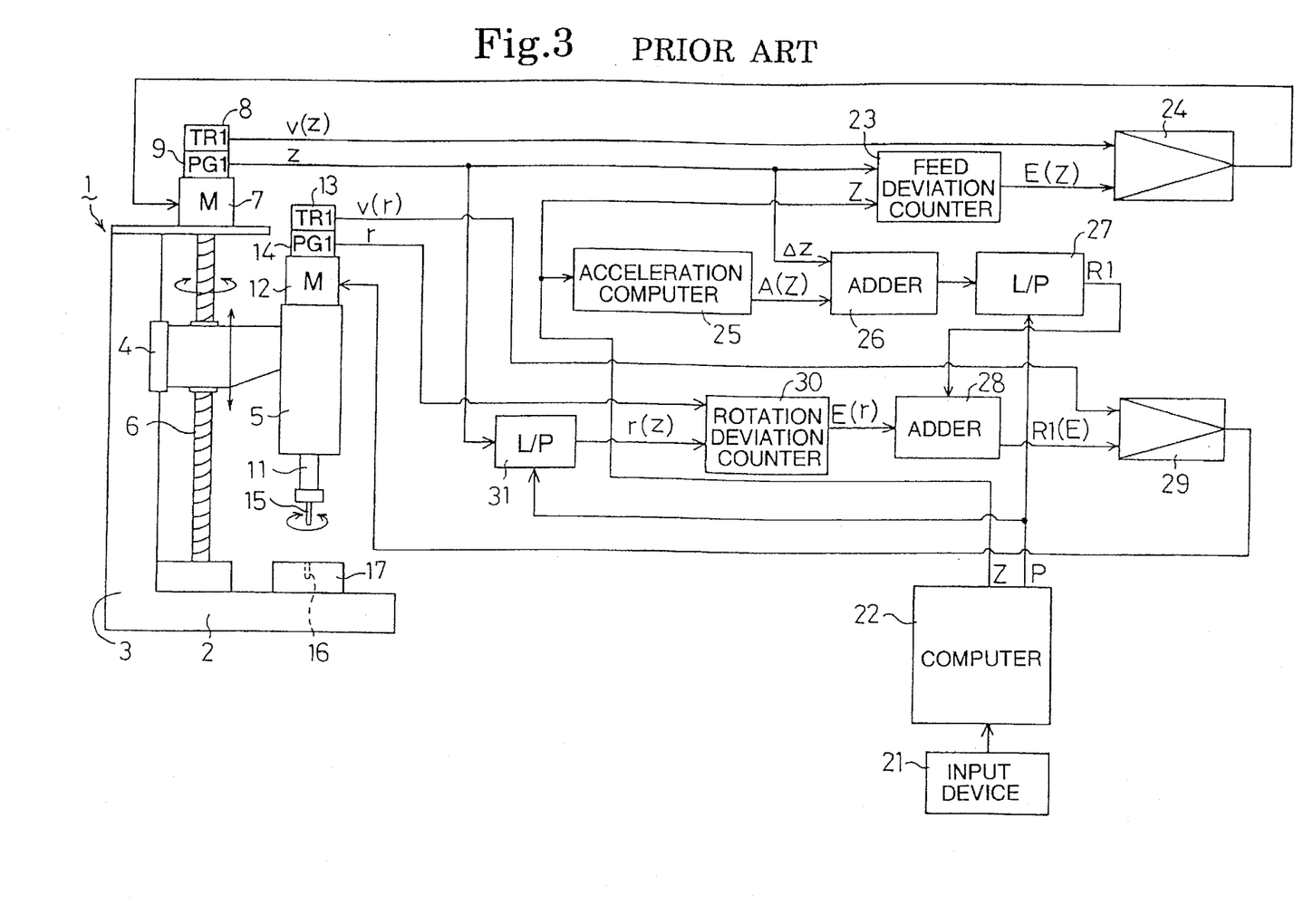
FIG. 3 is a block diagram of a prior art threading apparatus.

A prior art threading apparatus is shown in FIG. 3. A vertical tapping machine comprises a machine body 1. A spindle head 5 is vertically slidably supported by a slider 4 against a column 3, which extends vertically from a base 2. The spindle head 5 threadably engages a ball screw 6. The ball screw 6 is connected to a feed motor 7, which is in particular an AC servo motor. The ball screw 6 is rotated by the AC servo feed motor 7 to vertically move the spindle head 5. A tachometer generator 8 is attached to the feed motor 7 to detect the rotational (feed) velocity of the feed motor 7. A pulse generator 9 is also attached to the feed motor 7 to detect a rotational (feed) position of the spindle head 5. The pulse generator 9 forms feed position detecting means for detecting the feed position of the spindle head 5.

A spindle 11 is rotatably supported by the spindle head 5. The spindle 11 is rotated by a rotation motor 12, which is also in particular an AC servo motor. A tachometer generator 13 is attached to the AC servo rotation motor 12 to detect a rotational velocity of the AC servo motor 12. A pulse generator 14 is attached to the rotation motor 12 to detect a rotational position of the spindle 11. The pulse generator 14 forms rotational position detecting means for detecting the rotational position of the spindle 11. A tapping tool 15 is directly mounted on the lower end of the spindle 11. A tapper is not used, and in particular, a tapper is not placed between the spindle 11 and the tapping tool 15. The tapping tool 15 is rotated by the rotation motor 12 and fed by the feed motor 7 to thread a drilled hole 16 drilled in a workpiece 17.

A feed control circuit for vertically moving the spindle head 5 along the Z axis is also shown in FIG. 3. A feed command value Z is generated in a computer 22 based on data input from an input device 21. The feed command value Z is then output as a pulse train, corresponding to a feed velocity, to a feed deviation counter 23. The feed deviation counter 23 also inputs pulses corresponding to rotational angles of the feed motor 7 as a position feedback signal from the pulse generator 9. The feed deviation counter 23 then determines a feed deviation signal E(Z) as shown in Eq. (1):

$$E(Z)=Z-z \tag{1}$$

where Z is the feed command value, and z is a feed position detected by the pulse generator 9. The feed deviation counter 23 outputs the feed deviation signal E(Z) as a velocity command to a feed servo amplifier 24. The feed servo amplifier 24 also inputs a velocity signal v(z), corresponding to an actual velocity, as a velocity feedback signal from the tachometer generator 8. The feed servo amplifier 24 then outputs a feed motor control signal to the feed motor 7 based on the velocity signal v(z) and the feed deviation signal E(Z). Thus, a closed-loop velocity loop system drives the feed motor 7.

A rotation control circuit for rotating the spindle 11 about the Z axis is also shown in FIG. 3. In the rotation control circuit, a rotation command value R1 is not directly given from the input device 21, but rather is determined from the feed command value Z output from the computer 22. The feed command value Z output from the computer 22 is input into an acceleration computer 25. The acceleration computer 25 determines a feed acceleration signal A(Z), as shown in Eq. (2):

$$A(Z) = \frac{d}{dt} (\Delta Z) \tag{2}$$

where $\Delta Z$ is the feed command value per unit time. The acceleration computer 25 outputs the acceleration signal A(Z) to an adder 26. The adder 26 also inputs an actual feed quantity $\Delta z$ per unit time as a feed feedback pulse from the pulse generator 9. The adder 26 adds the actual feed quantity Δz and the acceleration signal A(Z) and outputs the sum to a rotation command value computer 27. The actual feed quantity Δz per unit time corresponds to the actual feed velocity v(z). Thus, the output from the adder 26 is the sum (Δz+d/dt(ΔZ)) of the feed velocity v(z) and the feed acceleration A(Z). The rotation command value computer 27 determines the rotation command value R1, as shown in Eq. (3):

$$R1 = \left( L \left( \Delta z + \frac{d}{dt} (\Delta Z) \right) \right)/P \quad (3)$$

where P is a pitch of screw threads and L is a lead of the ball screw 6. P is preliminarily input from the input device 21 through the computer 22. Thus, the rotation command value computer 27 multiplies the output from the adder 26 by L/P. The lead L of the ball screw 6 is preliminarily stored because it is a fixed value in the threading apparatus.

The rotation command value R1 output from the rotation command value computer 27 corresponds to the sum of the feed velocity v(z) and the feed acceleration A(Z). Thus, the rotation command value R1 is a predictive rotation command value of future movement of the spindle head 5. The rotation command value R1 is output through an adder 28 to a rotation servo amplifier 29. The adder 28 corrects the rotation command value R1. More specifically, pulses from the pulse generator 14 indicating a rotational position r of the spindle 11 are input into a rotation deviation counter 30. The pulses from the pulse generator 9 detecting the feed quantity z are input into a rotation correction computer 31. The rotation correction computer 31 determines a rotation correction value r(z), as shown in Eq. (4):

$$r(z)=(Lz)/P \quad (4)$$

Thus, r(z) corresponds to the feed quantity z multiplied by L/P. Then, the rotation correction computer 31 outputs the rotation correction value r(z) to the rotation deviation counter 30. The rotation deviation counter 30 determines a rotation deviation E(r) between the rotation correction value r(z) and the rotational position r of the spindle 11. The rotation deviation counter 30 outputs the rotation deviation E(r) to the adder 28. The adder 28 corrects the rotation command value R1 input from the rotation command value computer 27 using the rotation deviation E(r). The adder 28 then outputs a corrected rotation command value R1(E), as shown in Eq. (5):

$$R1(E)=R1+E(r) \quad (5)$$

The corrected rotation command value is then output to the rotation servo amplifier 29.

The rotation servo amplifier 29 also inputs a rotational velocity feedback signal v(r), corresponding to a velocity, from the tachometer generator 13. The rotation servo amplifier 29 then outputs a rotation motor control signal to the rotation motor 12 based on the velocity feedback signal v(r) and the corrected rotation command value R1(E). Thus, a closed-loop velocity loop system drives the rotation motor 12 based on the corrected rotation command value R1(E). With the above-outlined control circuit, the feed motor 7 is driven by inputting data including a screw pitch P, feed stroke (tapping depth), and feed velocity from the input device 21, and the rotation motor 12 is driven synchronously with the feed motor 7, thus performing threading.

Figure 4A:
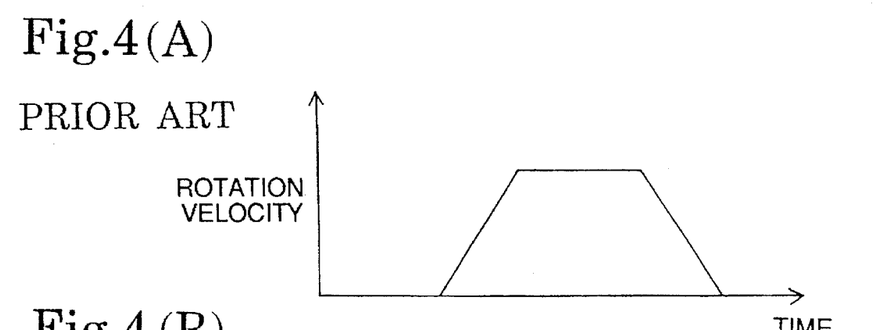
FIGS. 4A and 4B illustrate the operation of the prior art threading apparatus shown in FIG. 3.
Figure 4B:
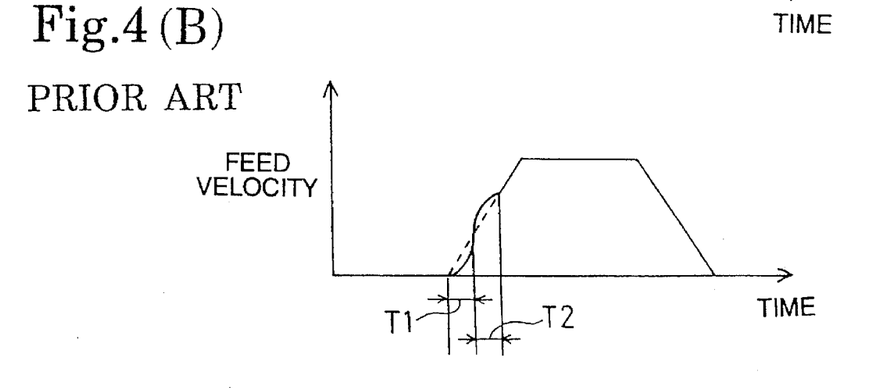

However, there is a possibility that an error due to static friction resistance may occur when starting the tapping operation. FIGS. 4A and 4B show a rotation velocity of the spindle 11, and a feed velocity of the spindle head 5, respectively, against the elapsed time. Since the feed system for the spindle head 5 has large static friction resistance, the feed velocity does not quickly rise in response to a velocity command, as shown by a solid line in FIG. 4B during period T1. The feed servo amplifier 24 generates a velocity deviation between the feed deviation E(Z) and the signal v(z) corresponding to the actual velocity as the velocity feedback signal from the tachometer generator 8. Accordingly, this velocity deviation increases with an elapsed time. When the driving force of the feed motor 7 overcomes the static friction resistance, the feed velocity rapidly rises during period T2. Once the feed operation is started, the static friction resistance changes to dynamic friction resistance and decreases in resistance value. Therefore, the feed operation is smoothly performed in accordance with the velocity command after the period T2. In contrast, the rotation system for the spindle 11 has friction resistance which is smaller than the friction resistance of the feed system. Accordingly, the spindle 11 is smoothly rotated from the start of the tapping operation. As a result, there occurs an error when starting the of tapping operation.

SUMMARY OF THE INVENTION

This invention provides a threading apparatus which eliminates a rise delay in the feed velocity of a spindle head due to friction resistance and is capable of performing high-precision and high-speed threading at a speed near the operational limit of a tapping tool.

In a preferred embodiment of this invention, a threading apparatus includes a spindle, a tool mounted on the spindle, a head supporting the spindle, a rotation motor for rotating the spindle on which the tool is mounted, rotation driving means for servo-controlling the rotation motor based on at least an input command value and a rotational position detection value, a feed motor for feeding the head supporting the spindle, and feed driving means for servo-controlling the feed motor based on at least an input command value and a feed position detection value, wherein the rotation motor and the feed motor are synchronously operated to thread a workpiece, and the feed driving means operates using an arbitrary gain, wherein the threading apparatus further includes gain changing means for selecting the gain of the feed driving means.

Preferably, the gain changing means selects the gain of the feed driving means to a high gain during a starting period of a threading operation, and selects a normal gain after a given elapsed time after starting the threading operation. Alternatively, the gain changing means selects the gains according to an operational condition of the rotation driving means or the feed driving means.

In this preferred embodiment, the feed driving means for driving the feed motor operates using arbitrary gains, including for example, a high gain high enough to overcome static friction resistance and a normal gain. The gain changing means selects the high gain for the feed driving means at a given time period, for example, when a rise delay in the feed velocity occurs, to compensate for the rise delay in the feed velocity, thus maintaining a good synchronization for accuracy, and improving a threading accuracy.

Further, the high gain is selected for the feed driving means for a given time period after starting the tapping operation, and the normal gain is thereafter selected for the feed driving means. Accordingly, a rise delay in the feed velocity due to static friction resistance present at the start of the tapping operation can be compensated for. After the given time period, the high gain is changed to the normal gain. Thus, errors in feed operation over the course of the tapping operation can be eliminated. Alternatively, the gains are changed based on the determination of a value output from the rotation driving means or the feed driving means to compensate for the rise delay in the feed velocity.

As described above, in the preferred embodiment of the threading apparatus of this invention, the feed driving means for driving the feed motor operates using arbitrary gains, and the gain changing means selects the gains, for example, between the high gain during a given time period after the start of the tapping operation, which is high enough to overcome static friction resistance, and the normal gain after the given time period after the start of the tapping operation, to compensate for the rise delay in the feed velocity due to the static friction resistance present at the start of the tapping operation. Accordingly, no errors occur over the course of the tapping operation, allowing high precision, high-speed threading to be performed. Further, the high gain is selected for the feed driving means until the given time period from the start of the tapping operation has elapsed. The normal gain is selected after the given time period has elapsed.

Alternatively, the gain for the feed driving means is changed according to an operational condition of the rotation driving means or the feed driving means, to permit tapping to be performed without a synchronization deviation between the rotation and the feed of the spindle.

BRIEF DESCRIPTION OF THE DRAWINGS

A preferred embodiment of this invention is described in detail with reference to the following drawings, wherein.

DETAILED DESCRIPTION OF THE PREFERRED EMBODIMENTS

Figure 1:
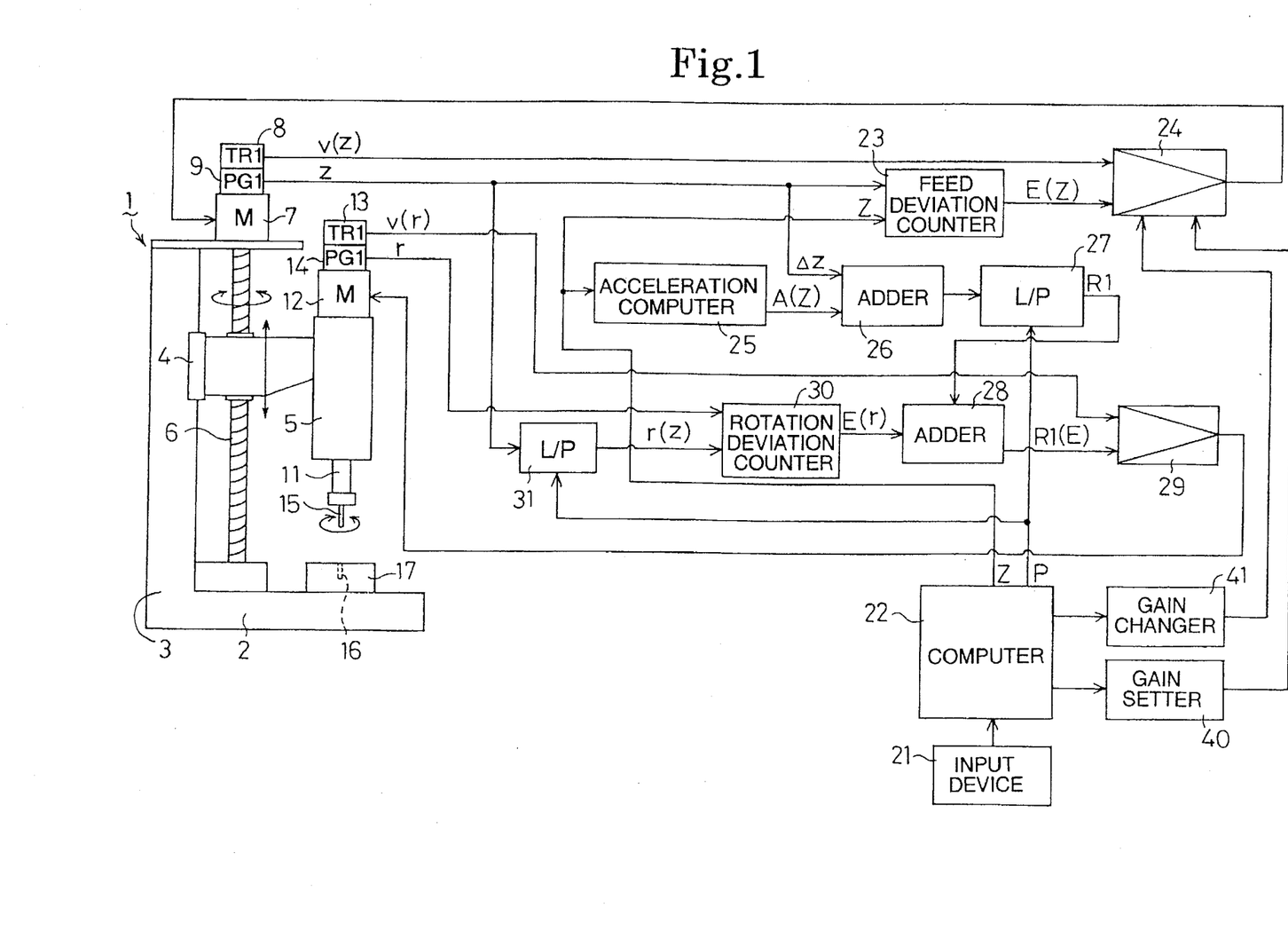
FIG. 1 is a block diagram of a threading apparatus incorporating a preferred embodiment of this invention.

FIG. 1 is a block diagram of a preferred embodiment of the threading apparatus. A vertical tapping machine comprises a machine body 1. A spindle head 5 is vertically slidably supported by a slider 4 against a column 3, which extends vertically from a base 2. The spindle head 5 threadably engages a ball screw 6. The ball screw 6 is connected to a feed motor 7, which is in particular an AC servo motor. The ball screw 6 is rotated by the AC servo feed motor 7 to vertically move the spindle head 5. A tachometer generator 8 is attached to the feed motor 7 to detect the rotational (feed) velocity of the feed motor 7. A pulse generator 9 is also attached to the feed motor 7 to detect a rotational (feed) position of the spindle head 5. The pulse generator 9 forms the feed position detecting means for detecting the feed position of the spindle head 5.

A spindle 11 is rotatably supported by the spindle head 5. The spindle 11 is rotated by a rotation motor 12, which is also in particular an AC servo motor. A tachometer generator 13 is attached to the AC servo rotation motor 12 to detect a rotational velocity of the AC servo motor 12. A pulse generator 14 is attached to the rotation motor 12 to detect a rotational position of the spindle 11. The pulse generator 14 forms the rotational position detecting means for detecting the rotational position of the spindle 11. A tapping tool 15 is directly mounted on the lower end of the spindle 11. A tapper is not used, and in particular, a tapper is not placed between the spindle 11 and the tapping tool 15. The tapping tool 15 is rotated by the rotation motor 12 and fed by the feed motor 7 to thread a drilled hole 16 drilled in a workpiece 17.

A feed control circuit for vertically moving the spindle head 5 along the Z axis is also shown in FIG. 1. A feed command value Z is generated in a computer 22 based on data input from an input device 21. The feed command value Z is then output as a pulse train, corresponding to a feed velocity, to a feed deviation counter 23. The feed deviation counter 23 also inputs pulses corresponding to rotational angles of the feed motor 7 as a position feedback signal from the pulse generator 9. The feed deviation counter 23 then determines a feed deviation signal E(Z) as shown in Eq. (1):

$$E(Z)=Z-z \tag{1}$$

where Z is the feed command value, and z is a feed position detected by the pulse generator 9. The feed deviation counter 23 outputs the feed deviation signal E(Z) as a velocity command to a feed servo amplifier 24. The feed servo amplifier 24 also inputs a velocity signal v(z), corresponding to an actual velocity, as a velocity feedback signal from the tachometer generator 8. The feed servo amplifier 24 then outputs a feed motor control signal to the feed motor 7 based on the velocity signal v(z) and the feed deviation signal E(Z). Thus, a closed-loop velocity loop system drives the feed motor 7.

A rotation control circuit for rotating the spindle 11 about the Z axis is also shown in FIG. 1. In the rotation control circuit, a rotation command value R1 is not directly given from the input device 21, but rather is determined from the feed command value Z output from the computer 22. The feed command value Z output from the computer 22 is input into an acceleration computer 25. The acceleration computer 25 determines a feed acceleration signal A(Z), as shown in Eq. (2):

$$A(Z)=\frac{d}{dt}(\Delta Z) \tag{2}$$

where ΔZ is the feed command value per unit time. The acceleration computer 25 outputs the acceleration signal A(Z) to an adder 26. The adder 26 also inputs an actual feed quantity Δz per unit time as a feed feedback pulse from the pulse generator 9. The adder 26 adds the actual feed quantity Δz and the acceleration signal A(Z) and outputs the sum to a rotation command value computer 27. The actual feed quantity Δz per unit time corresponds to the actual feed velocity v(z). Thus, the output from the adder 26 is the sum (Δz+d/dt(ΔZ)) of the feed velocity v(z) and the feed acceleration A(Z). The rotation command value computer 27 determines the rotation command value R1, as shown in Eq. (3):

$$R1=\left(L\left(\Delta z+\frac{d}{dt}(\Delta Z)\right)\right)/P \tag{3}$$

where P is a pitch of screw threads and L is a lead of the ball screw 6. P is preliminarily input from the input device 21 through the computer 22. Thus, the rotation command value computer 27 multiplies the output from the adder 26 by L/P. The lead L of the ball screw 6 is preliminarily stored because it is a fixed value in the threading apparatus.

The rotation command value R1 output from the rotation command value computer 27 corresponds to the sum of the feed velocity v(z) and the feed acceleration A(Z). Thus, the rotation command value R1 is a predictive rotation command value of future movement of the spindle head 5. The rotation command value R1 is output through an adder 28 to a rotation servo amplifier 29. The adder 28 corrects the rotation command value R1. More specifically, pulses from the pulse generator 14 indicating a rotational position r of the spindle 11 are input into a rotation deviation counter 30. The pulses from the pulse generator 9 detecting the feed quantity z are input into a rotation correction computer 31. The rotation correction computer 31 determines a rotation correction value r(z), as shown in Eq. (4):

$$r(z) = (Lz)/P \tag{4}$$

Thus, r(z) corresponds to the feed quantity z multiplied by L/P. Then, the rotation correction computer 31 outputs the rotation correction value r(z) to the rotation deviation counter 30. The rotation deviation counter 30 determines a rotation deviation E(r) between the rotation correction value r(z) and the rotational position r of the spindle 11. The rotation deviation counter 30 outputs the rotation deviation E(r) to the adder 28. The adder 28 corrects the rotation command value R1 input from the rotation command value computer 27 using the rotation deviation E(r). The adder 28 then outputs a corrected rotation command value R1(E), as shown in Eq. (5):

$$R1(E) = R1 + E(r) \tag{5}$$

The corrected rotation command value is then output to the rotation servo amplifier 29.

The rotation servo amplifier 29 also inputs a rotational velocity feedback signal v(r), corresponding to a velocity, from the tachometer generator 13. The rotation servo amplifier 29 then outputs a rotation motor control signal to the rotation motor 12 based on the velocity feedback signal v(r) and the corrected rotation command value R1(E). Thus, a closed-loop velocity loop system drives the rotation motor 12 based on the corrected rotation command value R1(E). With the above outlined control circuit, the feed motor 7 is driven by inputting data including a screw pitch P, feed stroke (tapping depth), and feed velocity from the input device 21, and the rotation motor 12 is driven synchronously with the feed motor 7, thus performing threading.

Therefore, the control circuit includes the rotation servo amplifier 29 for servo-controlling the rotation motor 12 and a feed servo amplifier 24 for servo-controlling the feed motor 7. The feed servo amplifier 24 and the rotation servo amplifier 29 synchronously operate the rotation motor 12 and the feed motor 7.

The feed servo amplifier 24 operates using an arbitrary gain. As shown in FIG. 1, a gain setter 40 sets the gain of the feed servo amplifier. In this preferred embodiment, the feed servo amplifier 24 operates using one of two gains. Two gain constants input from the input device 21 are input through the computer 22 into the gain setter 40. The gain setter 40 inputs the two gains into the feed servo amplifier 24. The two gains set into the feed servo amplifier 24 are preferably a high gain, which is high enough to overcome static friction resistance of the feed motor 7, and a normal gain.

A gain changer 41 changes the gains in the feed servo amplifier 24 at given timing intervals. The gain changer 41 inputs a timing signal from the computer 22 for changing the gain of the feed servo amplifier. The gain changer 41 outputs a changing command to the feed servo amplifier 24 based on an on/off state of the gain change timing signal. The gain change timing signal is turned on by the computer 22 at the start of a tapping operation and is turned off by the computer 22 after a given elapsed time. In other words, the feed servo amplifier 24 is controlled to operate using the high gain for a given period of time from the start of a tapping operation and is thereafter controlled to operate using the normal gain.

Figure 2A:
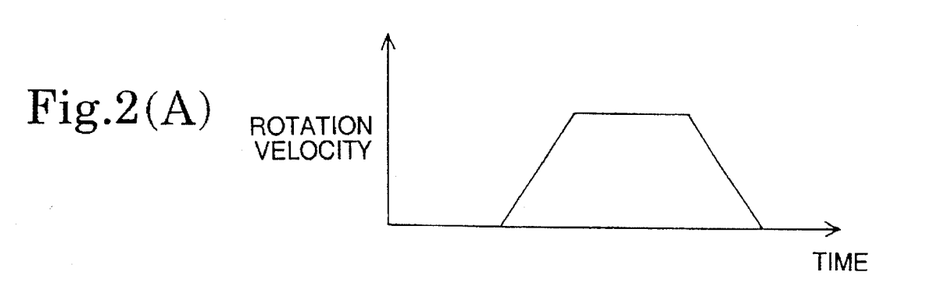
FIGS. 2A, 2B, and 2C illustrate the operation of the threading apparatus shown in FIG. 1.
Figures 2B, 2C:
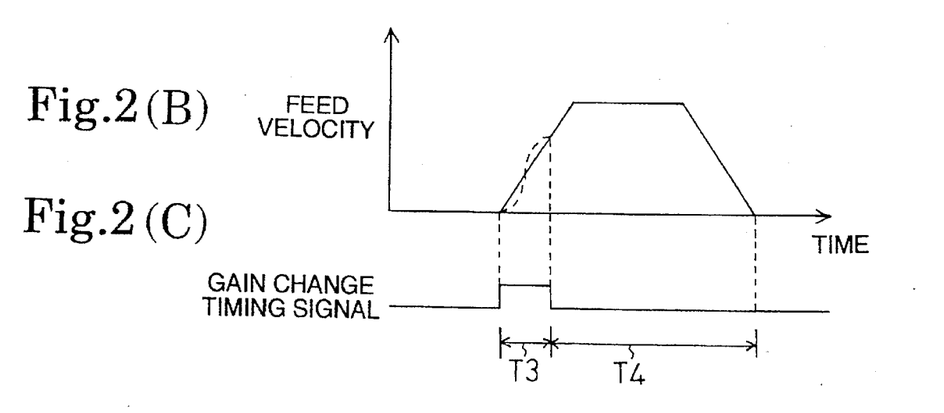

The operation of the preferred embodiment of threading apparatus is shown in FIGS. 2A, 2B, and 2C. FIGS. 2A, 2B, and 2C show the rotation velocity of the spindle 11 as a function of time, the feed velocity of the spindle head 5 as a function of time, and the state of the gain change timing signal as a function of the elapsed time from the start of a tapping operation, respectively. At the start of a tapping operation, the gain change timing signal is set to "on" for a given time period T3. During this time period T3, the feed servo amplifier 24 is controlled by the changing command output by the gain changer 41 to operate using the high gain. Therefore, the driving force of the feed motor 7 is able to overcome the static friction resistance to enable a smooth rise of the feed velocity, as shown by the solid line in FIG. 2B. The broken line in FIG. 2B indicates the feed velocity rise in the prior art apparatus, as shown in FIG. 3. After the given time period T3 has elapsed, the gain change timing signal output from the computer 22 to the gain changer is changed to "off" for a time period T4. During this time period T4, the feed servo amplifier 24 is controlled by the changing command signal output by the gain changer 41 to operate using the normal gain. Therefore, a smooth feeding operation is performed without the occurrence of hunting. In this manner, a smooth operation can be obtained over the course of a tapping operation, so that precise threading with no errors can be obtained.

Each control circuit shown in FIG. 1 can be formed by a dedicated or programmable integrated or other electronic circuit or device, for example, a hardwired electronic or digital logic circuit such as a discrete element circuit, or a programmable logic device such as a PLD, a PLA, a PAL or the like. Each control circuit can also be implemented using a suitably programmed general purpose computer, e.g., a microprocessor, microcontroller or other processor device. The gain changer 41 and the setter 42 may be realized using microcomputers, microprocessors, microcontrollers or other processor devices, ASICs, digital logic circuits, discrete element circuits, programmable logic devices such as PLDs, PLAs, or PALs, or the like.

It should be noted that this invention is not limited to the above preferred embodiment, but various modifications may be made. For example, although two gains are set into the feed servo amplifier 24 in the above-outlined preferred embodiment, three or more gains can be set into the feed servo amplifier 24. These 3 or more gains may more gradually change from a high gain to a low gain and be selected by the computer 22 in smaller time periods as time proceeds after the beginning of the tapping operation. Further, although the high gain is changed to the normal gain after a given elapsed time in the above preferred embodiment, the gains may be suitably changed according to the determination of various values, including the actual feed velocity v(z) generated from the tachometer generator 8, the feed deviation E(Z) generated from the feed deviation counter 23, the feed command value Z generated from the computer 22, the feed position z generated from the pulse generator 9, the rotation deviation E(r) generated from the rotation deviation counter 30, and the corrected rotation command value R(E) generated from the adder 28.

While the above description has been applied to the operation at the start of a tapping operation in a forward stroke, similar control may also be performed in a return stroke of the tapping operation because a similar phenomenon occurs also at the start of the tapping operation during the return stroke.

While the above description has been outlined with respect to a threading apparatus, similar control can also be used with any machine tool which both rotates a machine tool about an axis and feeds the machine tool along the axis to machine or work a workpiece, where precise control between the rotational position and the feed position must be maintained. Similar control can further be used with any machine tool which rotates a machine tool about a first axis and feeds the machine tool along a second axis to machine or work the workpiece, where precise control between the rotational position and the feed position must be maintained.

While this invention has been described in conjunction with the specific embodiments outline above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A threading apparatus, comprising:

tool means for threading a workpiece;

spindle means for rotatably mounting said tool means;

head means for movably supporting said spindle means along a longitudinal axis of the threading apparatus;

rotation means for rotating said spindle means;

rotation driving means for servo-controllably energizing said rotation means based on at least a rotation command and a rotational position of said spindle means;

feed means for feeding said head means;

gain changing means for selecting one of a plurality of gains; and feed driving means for servo-controllably energizing said feed means based on at least a feed command, a feed position of said head means, and a gain selected by said gain changing means;

wherein said rotation means and said feed means are synchronously operated.

2. The threading apparatus of claim 1, wherein said gain changing means selects a high gain during a starting period of an operation cycle of the threading apparatus and selects a normal gain after the starting period.

3. The threading apparatus of claim 1, wherein said gain changing means selects the one of the plurality of gains based on an operational condition of at least one of said rotation driving means and said feed driving means.

4. A threading apparatus, comprising:

a spindle;

a tool mounted on said spindle;

a head supporting said spindle;

a rotation motor rotating said spindle;

a servo-control rotation drive circuit driving said rotation motor based, on at least an input command value and a rotational position detection value;

a feed motor feeding said head;

a gain changing circuit selectively setting one of a plurality of gains; and a servo-control feed drive circuit driving said feed motor based on at least an input command value, a feed position detection value, and the gain set by said gain changing circuit;

wherein said rotation motor and said feed motor are synchronously operated.

5. The threading apparatus of claim 4, wherein said gain changing circuit sets a high gain during a starting period of an operation cycle of the threading apparatus and sets a normal gain after the starting period.

6. The threading apparatus of claim 4, wherein said gain changing circuit selectively sets one of the plurality of gains based on an operational condition of at least one of said rotation drive circuit and said feed drive circuit.

7. The threading apparatus of claim 4, wherein said gain changing circuit comprises:

a gain setting circuit for inputting the plurality of gains into said servo-control feed drive circuit; and a gain change circuit for selectively changing the set one of the plurality of gains.

8. The threading apparatus of claim 7, wherein said gain setting circuit sets at least a high gain sufficient to overcome a static friction resistance of said head and a normal gain sufficient to overcome a dynamic resistance of said head.

9. The threading apparatus of claim 8, wherein said gain change circuit selects the high gain during a starting period of an operation cycle of the threading apparatus and selects the normal gain after the starting period.

10. The threading apparatus of claim 8, wherein:

said gain setting circuit sets an intermediate gain between the high gain and the normal gain; and said gain change circuit selects the high gain during a starting period of an operation cycle of the threading apparatus, selects the intermediate gain during a second period after the starting period, and selects the normal gain after the second period.

11. The threading apparatus of claim 8, wherein:

said servo-control feed drive circuit comprises:

a head tachometer detecting a feed velocity of said head and outputting a feed velocity signal, a head position detector for detecting a longitudinal position of said head and outputting a feed pulse signal indicative of the longitudinal position of said head, and a feed deviation circuit outputting a feed deviation signal based on the input command value and the feed pulse signal; and said gain change circuit selects between the high gain and the normal gain based on at least one of the feed velocity signal and the feed deviation signal.

12. A method for operating a control circuit of a machine tool apparatus comprising a feed device for feeding a tool along a longitudinal axis and a rotation device for rotating a tool about the longitudinal axis, the control circuit controllably driving the feed device and the rotation device, the method comprising the steps of:

inputting a feed command to the control circuit;

determining a rotation command based on the input feed command;

setting a first gain into the control circuit prior to initiating a machining operation of the machine tool apparatus;

initiating the machining operation of the machine tool apparatus to machine a workpiece based on the feed command, the rotation command, and the first gain;

machining the workpiece based on the feed command, the rotation command, the first gain during a starting period after initiating the machining operation;

setting a second gain into the control circuit; and continuing the machining operation based on the feed command, the rotation command, and the second gain during a second period after the starting period.

13. The method of claim 12, wherein the starting period is a predetermined elapsed time after a beginning of the machining operation.

14. The method of claim 12, wherein the control circuit comprises a rotation device drive circuit and a feed device drive circuit, the method further comprising the step of determining the starting period based on an operational condition of at least one of the rotation device drive circuit and the feed device drive circuit.

15. The method of claim 14, further comprising the steps of setting one of at least the first gain, the second gain, and at least one other gain into the control circuit during the machining operation of the machine tool apparatus after the starting period of the machine tool apparatus based on the operational condition of at least one of the rotation device drive circuit and the feed device drive circuit.

16. The method of claim 12, further comprising the steps of:

setting an intermediate gain into the control circuit during the machining operation of the machine tool apparatus; and continuing the machining operation based on the feed command, the rotation command, and the intermediate gain during an intermediate period between the starting period and the second period.

17. The method of claim 16, wherein the intermediate gain setting step and the intermediate gain continuing step are repeated a plurality of times between the starting period and the second period for each of a plurality of intermediate gains.

18. The method of claim 12, wherein the machining operation comprises at least one of a forward stroke of the machine tool apparatus and a return stroke of the machine tool apparatus.

* * * * *